Sept. 11, 1951      B. S. CROSS ET AL      2,567,186

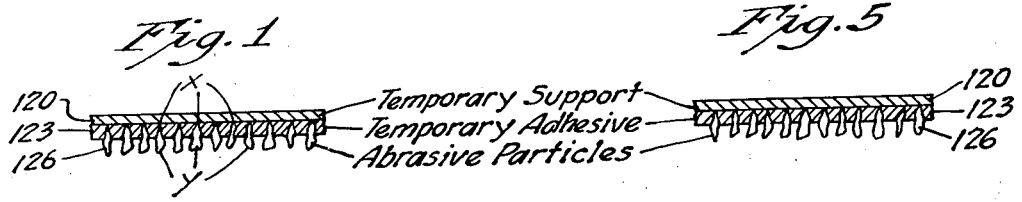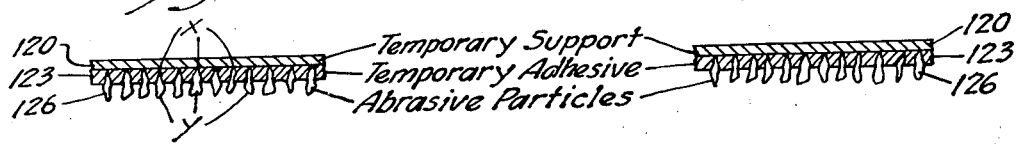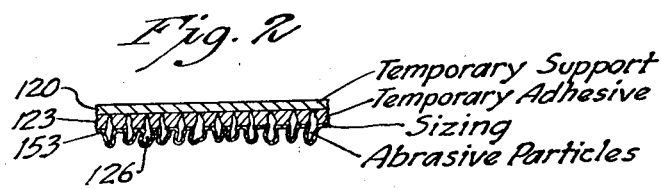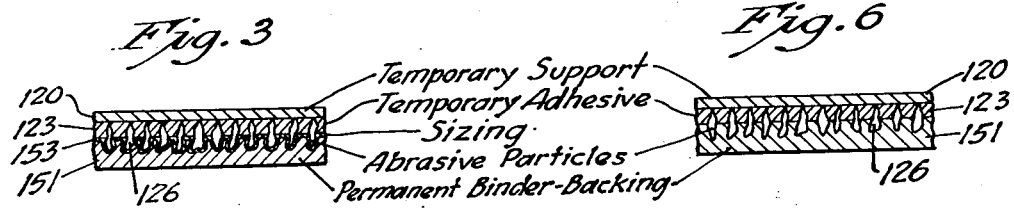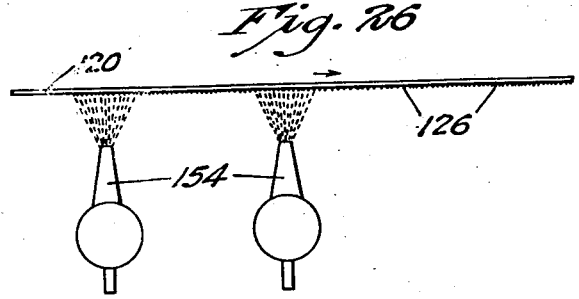

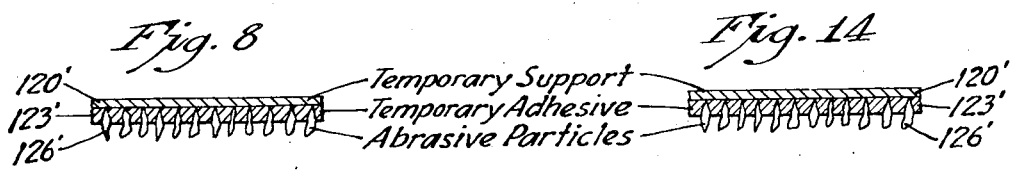
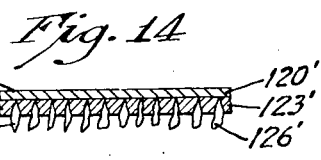
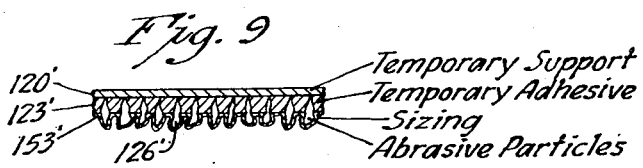
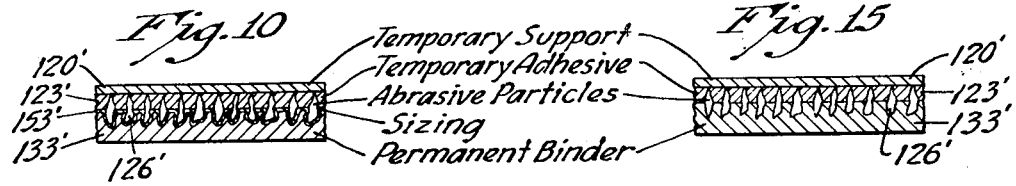
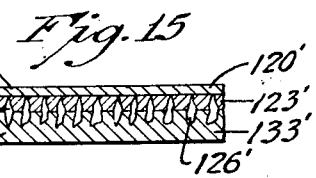
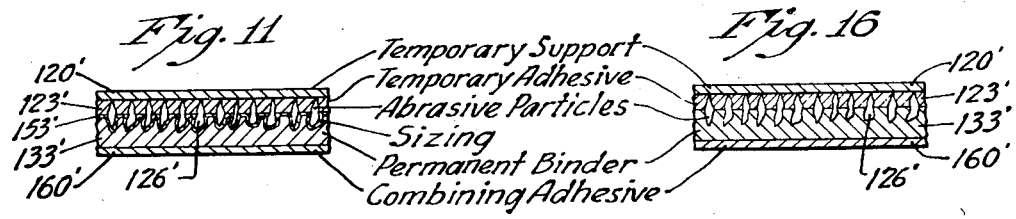
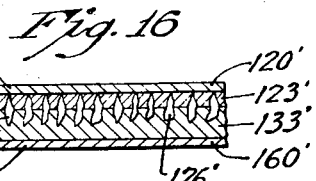
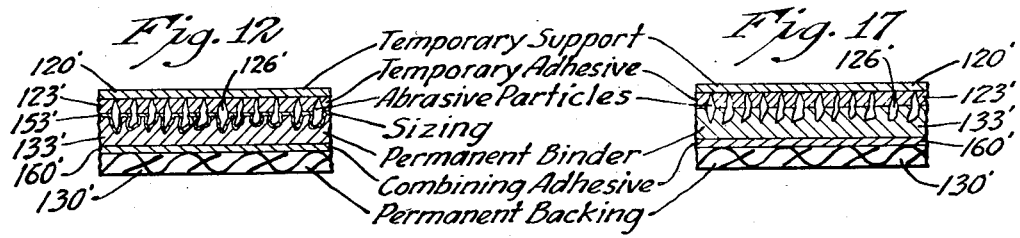
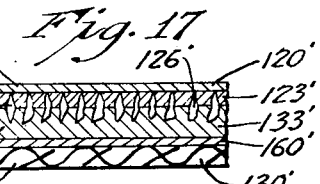
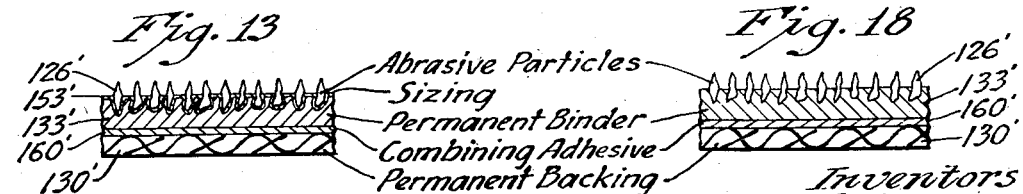

INVERSE METHOD OF FORMING PARTICULATE COATED SHEETS

Original Filed Nov. 12, 1943      3 Sheets-Sheet 3

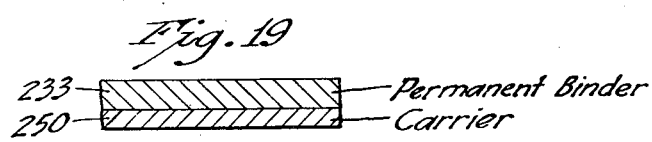

Fig. 19
- 233 — Permanent Binder
- 250 — Carrier

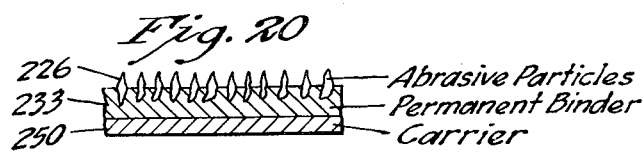

Fig. 20
- 226 — Abrasive Particles
- 233 — Permanent Binder
- 250 — Carrier

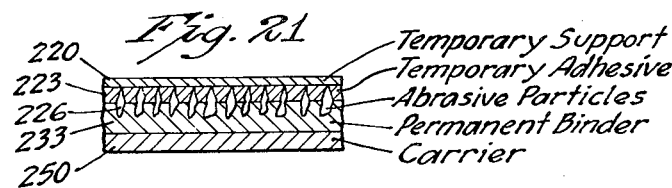

Fig. 21
- 220 — Temporary Support
- 223 — Temporary Adhesive
- 226 — Abrasive Particles
- 233 — Permanent Binder
- 250 — Carrier

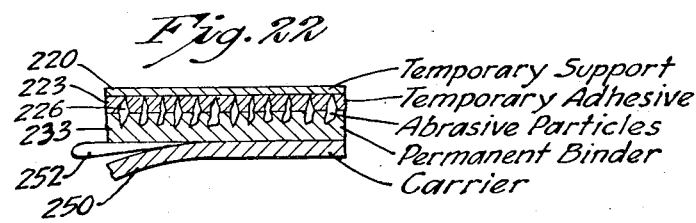

Fig. 22
- 220 — Temporary Support
- 223 — Temporary Adhesive
- 226 — Abrasive Particles
- 233 — Permanent Binder
- 252 —
- 250 — Carrier

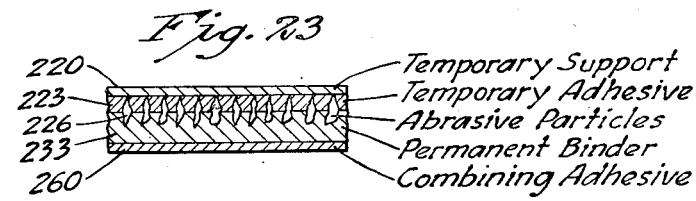

Fig. 23
- 220 — Temporary Support
- 223 — Temporary Adhesive
- 226 — Abrasive Particles
- 233 — Permanent Binder
- 260 — Combining Adhesive

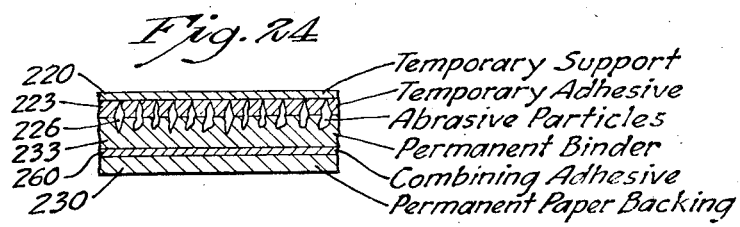

Fig. 24
- 220 — Temporary Support
- 223 — Temporary Adhesive
- 226 — Abrasive Particles
- 233 — Permanent Binder
- 260 — Combining Adhesive
- 230 — Permanent Paper Backing

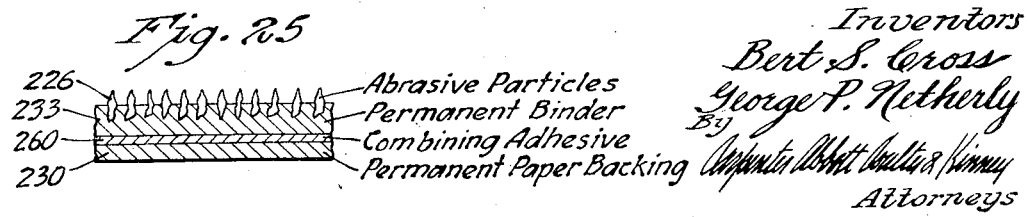

Fig. 25
- 226 — Abrasive Particles
- 233 — Permanent Binder
- 260 — Combining Adhesive
- 230 — Permanent Paper Backing Inventors
Bert S. Cross
George P. Netherly
By
Carpenter Abbott Coulter & Kinney
Attorneys Patented Sept. 11, 1951

2,567,186

UNITED STATES PATENT OFFICE 2,567,186

INVERSE METHOD OF FORMING PARTICULATE COATED SHEETS

Bert S. Cross, St. Paul, and George P. Netherly, Afton, Minn., assignors to Minnesota Mining & Manufacturing Company, St. Paul, Minn., a corporation of Delaware Original application November 12, 1943, Serial No. 510,010. Divided and this application June 23, 1948, Serial No. 34,804

9 Claims. (Cl. 154—95)

This invention relates to particulate coated articles and methods of making them.

Such articles usually comprise (1) a backing, (2) a binder layer that adheres the particles to each other and to the backing, and (3) the particles themselves. Articles of this class will hereinafter be referred to as "backed" articles.

Particulate coated articles may also comprise (1) a combined binder and backing and (2) the particles. Articles of this class will hereinafter be referred to as "backless" articles.

Previous methods of forming both the backed and the backless types, postpone the step of introducing the particles until after the other elements are in place. Backed articles, for example, are usually made by coating a backing with a binder, and then depositing the particles onto the said coating. Backless articles are usually made by forming a layer of the binder-backing and then depositing the particles onto the said layer. These prior methods have certain disadvantages, particularly in the formation of backed articles that have binders requiring a high temperature heat cure and backings to which such heat is harmful, e. g., cellulosic backings, such as paper or cloth.

Objects of the invention include:

The provision of particulate coated articles having undeteriorated cellulosic backings in combination with high temperature heat cured binders;

The provision of a method for curing the binders of backed particulate coated articles prior to the application of the backing;

The provision of a method of casting or forming the binders of backed particulate coated articles in their ultimate form and position in respect to the particles, prior to the application of the backing;

The provision of a new and improved method of forming backless particulate coated articles.

Briefly the invention provides what may be termed an "inverse" method of forming particulate coated articles.

In forming backless articles according to this invention, the particles are assembled and temporarily held in the formation they will occupy in the completed article, a layer of the combined binder-backing is then formed around the particles, the binder-backing is then cured, and the temporary holding means is then released.

In forming backed articles according to this invention, the particles are similarly assembled and temporarily held in the formation they will occupy in the completed article, a binder layer is then formed around the particles, the binder is then cured, the backing or body of the article is then applied to the side of the cured binder layer that is opposite the particles, and the temporary holding means is released.

Sheeted abrasive articles (commonly called "sandpaper") and methods of making them are described below as illustrative embodiments of this invention, and are illustrated in the following drawings, in which:

Figures 1 to 7 are vertical sections of backless sandpaper at various stages during and after the process of its manufacture;

Figures 8 to 18 are similar views of the making of backed sandpaper;

Figures 19 to 25 are similar views of the making of backed sandpaper by a modified form of the method; and Figure 26 shows a coating means.

The said inverse method may be utilized to form backless articles by providing a temporary support 120, coating it in a suitable manner with a temporary adhesive 123 and depositing abrasive grains or other particles 126 thereon, so that they are embedded to the desired depth in the adhesive layer 123. The coated article (Figure 1) thus formed may then be treated on its coated side with a sizing coat 153 (Figure 2). This initial application of the permanent bond may be made in any suitable manner, e. g. by being sprayed on in atomized form, as by one or more spray-nozzles 154 (Figure 26). After setting or hardening this initial bond coat or size, the permanent binder-backing 151 may then be applied over the initial bond coat 153 and the particles 126 (Figure 3) in a suitable manner. It may be applied in atomized form by suitable spraying means, represented herein by the nozzles 154 shown in Figure 26, or it may be applied by other means known in the coating art. It is preferable that the sandsizing coat 153 be of such character in relation to the material of the permanent binder-backing 151 as to be substantially unsoftened and undissolved thereby, especially when the web 120 is positioned so that the grits or particles 126 are on the top side of the web during the time that the binder-backing layer 151 is being applied. For example, the sizing coat 153 may be a heat-convertible or non-thermoplastic synthetic material and the layer 151 may be glue, polyvinyl alcohol, vinyl butyral resins, etc., or mixtures thereof, the coat 153 being hardened or cured before the application of the layer 151 to avoid softening thereof or dislocation of the particles 126.

After the binder-backing 151 and/or the sizing 153 have set or hardened sufficiently to hold the particles 126 when the temporary support 120 and temporary adhesive 123 is removed, the said support and adhesive may then be removed, leaving a backless article comprising the particles 126 held by the sizing 153 and binder-backing 151 with the extremities $x$ of the particles, which were originally embedded in the temporary adhesive layer 123, exposed (Figure 4).

The sizing coat 153 often may be omitted, as shown in Figures 5, 6 and 7, but it is desirable under many conditions. For example, it is desirable when the viscosity or composition of the binder-backing 151 is such as to disturb the particles, as by capillary action or by softening the temporary adhesive 123, or when the binder-backing layer 151 is being applied by knife-coating.

The present invention also finds utility in forming backed articles, e. g., particulate coated articles comprising a cloth, paper or other cellulosic backing, or any backing which will degenerate at high temperatures, with particles adhered thereto by a binder of a type that requires curing temperatures so high that an attached cellulosic or comparable backing would be destroyed or deteriorated thereby. Such binders include ceramic materials including sodium silicate cements, phosphate cements, etc., resins which require a high temperature to cure them to the optimum stage, i. e. "high heat-cure" resins such as phenol aldehyde resin molding powders (where curing temperatures of 400° F., 450° F., and sometimes higher, are desirable) and urea aldehyde-alkyd resin combinations (where the alkyd resin plasticizes the urea aldehyde resin and curing temperatures at least of the order of 450° F. are desirable), and high melting materials, e. g. methyl methacrylate resins (which are thermoplastic but have a high melting point, in the use of which temperatures of the order of 500° F. are desirable), etc. Suitable steps in the method of making such articles according to this invention are shown in Figures 8 to 13 and also in Figures 14 to 18.

The temporary support 120' is preferably a heat-resistant material such as steel or the like, and the permanent binder 133' may be applied in the manner of applying the layer 151, as described in connection with Figure 3. After curing the binder 133', a permanent cloth backing 130' may be adhered thereto by a suitable combining adhesive 160' and the temporary support 120' then stripped away, leaving the backed article shown in Figure 13 (if an intermediate sizing coat 153' has been applied) or the backed article shown in Figure 18 (if the sizing coat 153' has been omitted).

According to a modified form, the binder and particles may be deposited and cured in layer form on a temporary heat-resistant carrier or support 250 (Figures 19 and 20). A second temporary support 220 is then temporarily adhered to the particulate coated side of the cured layer 233 before the latter is stripped from the carrier 250 (Figure 21). The second temporary support 220 serves to hold the layer 233 in its desired sheeted form notwithstanding any break-up thereof that may be caused by stripping, as for example, where the binder is quite inflexible. After the layer 233 has been stripped from the carrier 250 by a knife 252 (Figure 22) and has been combined by a combining adhesive 260 with a permanent paper backing 230, the second temporary support 220 may then be removed, leaving the backed article shown in Fig. 25.

This curing of the binder layer before combining it with the permanent backing, as described above in connection with Figures 8 to 18 and 19 to 25, provides a new result in terms of article or product, as well as a new method. For example, in connection with coated abrasives, an article is produced having a cloth or comparable backing which is at full strength and is undegenerated by heat, and adhered to such backing is a binder layer or coat which has been cured (with the grits in situ therein, and preferably in oriented position) by heating to temperatures which would have ruined the cloth, e. g. temperatures of 400° or 500° F., or higher. This is a broadly new result in the coated abrasive art, to the best of our knowledge, and makes a broad change in the limitations of prior practices.

The application of the binder-backing layer 151 and of the binder layer 133' is illustrated herein as being made when the particulate coated side of the supports 120 and 120' face downwardly, but it will be obvious that the said application, whether by knife-coating, by flowing the same on as a liquid, by spraying or by other means, may be made when the coated side of the support faces upwardly or in any other direction. The same is true of the application of the sizing coats 153 and 153' to the particulate coated sides of the temporary supports 120 and 120', respectively.

The combining adhesives 160' and 260 may be any material suitable for adhering the particular binder layer to the particular permanent backing that is being used. For example, where the permanent binder is a phenol aldehyde resin, a sodium silicate cement, or the like, the said combining adhesive may be a vinyl acetal resin, e. g. polyvinyl butyral, in viscous mobile condition, usually employing a solvent. Also ethyl cellulose adhesives, or even animal glue, or the like, may be used as a combining adhesive, to join the permanent binder layer to the cloth, paper or other permanent backing sheet.

The temporary adhesives 123, 123' and 223 may, for example, be a normally tacky or pressure-sensitive type of rubber adhesive characterized by being more strongly cohesive than adhesive so that the particles can be separated therefrom without withdrawing the adhesive with them. Other suitable adhesives include glue, resin, starch, dextrin, silicate cement, syrup, wax, paraffin, etc.

If the method of Figures 8 to 18 is employed for making backed articles whose binders do not require a heat cure that would destroy the backing, the combining adhesive 160' may be omitted and the backing 130' adhered directly to the binder 133' before the latter loses its tack. In such cases, the binder may be completely cured before removal of the temporary support or it may be cured only enough to retain the particles, with further curing after removal of the temporary support. The finished articles then appear as in Figures 13 and 18 except for the omission of the layer 160'.

The temporary supports 120, 120' and 220, and the carrier 250, may be of any thickness, and of any dimension, e. g., they may be of relatively small area for batch operations, or they may be relatively long in sheet form for continuous operations.

Although sandpaper and methods of making it are described and illustrated herein, it is to be understood that these embodiments are merely illustrative of the present invention and that the invention may also be embodied in highly useful articles that are coated with particles other than abrasive particles, such as particles or beads of glass, stone, metal, flock, cork, mineral, roofing granules, etc.

This application is a division of our application Serial No. 510,010, filed November 12, 1943, the latter having been abandoned after the filing of the present application.

Certain phases of the disclosure of the said parent application are claimed in our copending application Serial No. 43,528, now Patent No. 2,548,872, which was filed August 10, 1948, as a continuation of the said parent application, and in our copending application Serial No. 169,756 which was filed June 23, 1950, as a division of Serial No. 43,528.

The method claimed in the said continuation application Serial No. 43,528 is a mtehod of transfer coating, one feature of which is a controlled positioning of the particles. If desired, the said controlled positioning may be secured in the practice of the inverse method that is being claimed in the present application. For example, in the method described hereinabove and illustrated in Figures 1 to 4, the extremities x of the particles 126 may be made collectively to conform to the adhesive coated surface of the support 120. The support may then be positioned so that its said surface has a desired contour, and after maintaining the said position until the sizing 153 and the binder-backing 151 have set sufficiently to hold the particles fixed upon removal of the support 120, the support may then be removed, leaving the particles held by the binder-backing 151 and the sizing 153 with the extremities x of the particles 126 exposed to form a surface having a contour complementary to that of the support 120.

We claim:

1. In the method of making a particulate coated sheet that comprises a sheeted binder-backing and a layer of particles bonded therein, the steps comprising coating a surface of a sheeted temporary support with a layer of adhesive, depositing particles on the adhesive coated side of the support in contact with the adhesive with their opposite portions extending outwardly from the adhesive, coating a layer of a permanent binder-backing material in viscous plastic state onto the particulate coated side of the support, allowing the binder-backing material to set sufficiently to retain the particles upon removal of the temporary support, and then removing the temporary support, leaving a particulate coated sheet comprising the sheeted permanent binder-backing with the layer of particles bonded therein.

2. The method of claim 1 further characterized in the addition of the intermediate step of applying a sizing coat to the particulate coated side of the temporary support before applying the permanent binder-backing.

3. An inverse method of forming backed particulate coated sheets comprising temporarily adhering the particles to a sheeted temporary support with the extremities of the particles extending outwardly from the temporary adhesive, coating a layer of a permanent binder in viscous plastic state on the particulate coated side of the support, applying a sheeted permanent backing to the exposed side of the binder layer, curing the binder sufficiently to retain the particles upon removal of the temporary support and then removing the temporary support.

4. In the method of forming particulate coated articles that comprise a cellulosic backing with particles retained by a binder whose curing would be destructive to the backing, the steps comprising temporarily adhering the particles to a heat-resistant sheeted temporary support with the extremities of the particles extending outwardly from the temporary adhesive, propelling the sheeted support longitudinally, coating a layer of the permanent binder on the particulate coated side of the moving sheeted support, curing the binder layer, adhering the exposed side of the binder layer to the cellulosic backing by a combining adhesive and then removing the temporary support.

5. The method of claim 4 further characterized in the addition of the intermediate step of applying a sizing coat to the particulate coated side of the temporary support before applying the permanent binder.

6. In the method of forming particulate coated articles that comprise a cellulosic backing with particles retained by a binder whose curing would be destructive to the backing, the steps comprising forming a layer of the binder in viscous, plastic state on a first temporary support, depositing the particles on the exposed surface of the binder layer, curing the binder layer, temporarily adhering a second temporary support to the particulate coated side of the binder layer, stripping the binder layer from the first support, adhering the exposed side of the binder layer to the cellulosic backing by a combining adhesive and then removing the second temporary support.

7. In the method of making a particulate coated sheet that comprises a sheeted binder-backing and a layer of particles bonded therein, the steps comprising coating a surface of a sheeted temporary support with a layer of adhesive, depositing particles on the adhesive coated side of the support in contact with the adhesive with their opposite portions extending outwardly from the adhesive, propelling the sheeted support longitudinally, coating a layer of a permanent binder-backing material in viscous plastic state onto the particulate coated side of the moving sheeted support, allowing the binder-backing material to set sufficiently to retain the particles upon removal of the temporary support and then removing the temporary support, leaving a particulate coated sheet comprising the sheeted permanent binder-backing with the layer of particles bonded therein.

8. In the method of forming laminated sheet material which comprises a backing sheet, a binder layer and a layer of particles bonded therein, the steps comprising coating the layer of particles onto a temporary support, coating a layer of binder material in viscous, plastic state over the layer of particles, applying the backing sheet to the binder layer and removing the temporary support.

9. The method of claim 8 further characterized in the addition of the intermediate step of applying a sizing coat to the particulate coated side of the temporary support before applying the binder material.

BERT S. CROSS.
GEORGE P. NETHERLY.

REFERENCES CITED

The following references are of record in the file of this patent:

UNITED STATES PATENTS

| Number | Name | Date |
| --- | --- | --- |
| Re. 17,740 | Martin | July 22, 1930 |
| 1,905,061 | Sax | Apr. 25, 1933 |
| 2,004,466 | Dietz et al. | June 11, 1935 |
| 2,015,658 | Bezzenberger | Oct. 1, 1935 |
| 2,033,991 | Melton et al. | Mar. 17, 1936 |
| 2,105,915 | Griffin | Jan. 18, 1938 |
| 2,143,636 | Tone | Jan. 10, 1939 |
| 2,201,196 | Williamson | May 21, 1940 |
| 2,220,140 | Bartling et al. | Nov. 5, 1940 |
| 2,281,558 | Cross | May 5, 1942 |
| 2,376,922 | King | May 29, 1945 |